F. DUVALL.
STRAINER.
APPLICATION FILED MAY 6, 1919.
1,327,532.
Patented Jan. 6, 1920.
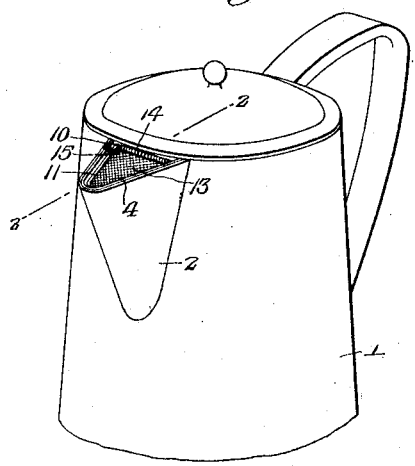
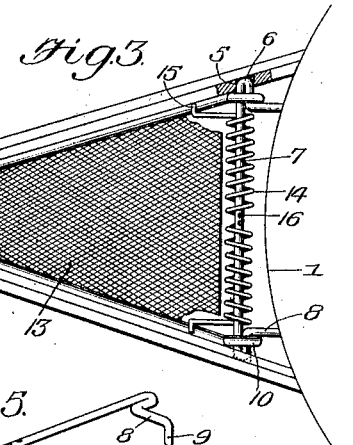
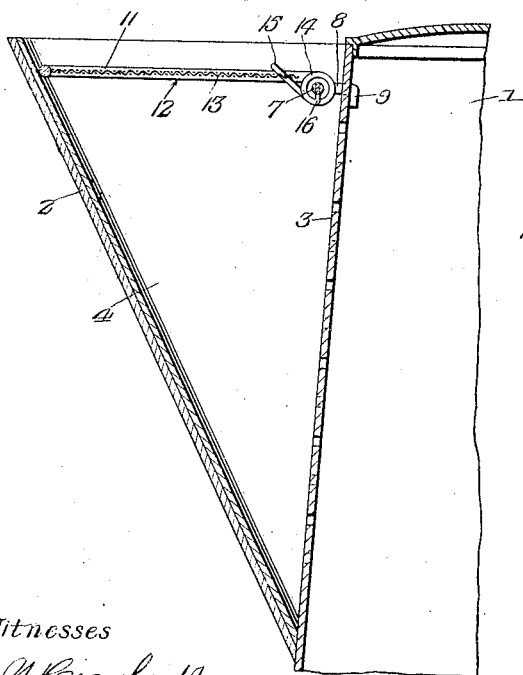
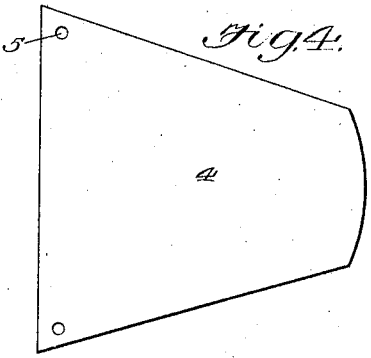
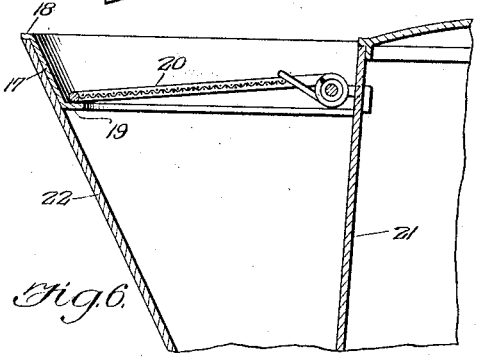
Inventor
Flora Duvall,
By Victor J. Evans
Attorney
Witnesses
J. H. Crawford

UNITED STATES PATENT OFFICE.

FLORA DUVALL, OF CHICAGO, ILLINOIS.

STRAINER.

1,327,532.  Specification of Letters Patent.  Patented Jan. 6, 1920.

Application filed May 6, 1919. Serial No. 295,155.

*To all whom it may concern:*

Be it known that I, FLORA DUVALL, a citizen of the United States, residing at Chicago, in the county of Cook and State of Illinois, have invented new and useful Improvements in Strainers, of which the following is a specification.

This invention has reference to a strainer attachment for coffee and tea pots, and has for its object to provide a simple device which may be readily attached to the spout of the vessel so that the liquid passing through the spout will be effectively strained.

Other objects and advantages will present themselves as the nature of the invention is better understood, reference being had to the accompanying drawing, in which:

Figure 1 is a view illustrating the application of the improvement.

Fig. 2 is a sectional view approximately on the line 2—2 of Fig. 1.

Fig. 3 is a perspective view of the improvement detached.

Fig. 4 is a view of the blank from which the body or auxiliary spout is formed.

Fig. 5 is a view of the shaft for the reticulated screening member.

Fig. 6 is a view of a modification.

In the drawings a coffee pot of the ordinary construction is indicated by the numeral 1, the pouring spout therefor by the numeral 2 and the reticulated or perforated surface inclosed by the spout 2 is indicated by the numeral 3. Through the openings 3 the coffee or tea is usually poured and directed from the spout 2. These openings are in most instances comparatively large, so that the coffee and tea grounds pass therethrough.

With my improvement I employ a resilient metal sheet substantially V-shaped in plan which constitutes what I will term the body of the improvement and which is indicated by the numeral 4. This sheet I bend from the center thereof so that the same is substantially U-shaped in plan. The sides of the body 4, adjacent the outer and wider end thereof have alining openings 5 therethrough, and these openings are designed to receive therein the ends 6 of a shaft 7. The shaft is preferably constructed from a strand of wire and is bent upon itself at its ends 6, continued inwardly a suitable distance in lapping engagement with the shaft proper and from thence bent outwardly as at 8 and downwardly as at 9. The portions 9 provide hooks, and these hooks are designed to be received in certain of the apertures or openings 3 in the vessel 1. Hingedly secured, as at 10 to the shaft 7 is the outer bail-shaped wire member 11 of the strainer 12. Between the wire member and the shaft 7 the strainer member 12 is a reticulated facing 13.

Surrounding the shaft 7 is a coil spring 14. One of the ends of the spring 14 is offset and engages with the member 11, as indicated by the numeral 15, and the other end of the spring is secured to the shaft 7 as indicated by the numeral 16. The body 4 is in the nature of a flared member when in operative position, and the screening frame, contacting with the inner face thereof is held against downward movement. The spring exerts a pressure to hold the frame against outward movement. The body 4, being constructed of metal is resilient, and the same contacting with the inner face of the spout 2 tightly engages therewith. The screening frame may be swung outwardly when the body and screen are to be cleaned. The hooks 9 may be readily disengaged from the apertures or openings 3 and both the screen and body may be disengaged from the spout and vessel.

In Fig. 6 the device is substantially similar to that previously described, except that the body member 17 has its outer edge flanged as at 18 to overlie the rim of the spout 2. The body 17 may also, if desired, have its inner edge provided with an inturned flange 19, and on this flange the straining member or frame 20 rests. The straining member 20 is influenced against the flange 19 by a spring similar to the spring 14, and the shaft for the frame and spring is similar to that previously described, having its ends hooked to engage with apertures in the vessel 21, the frame frictionally contacting with the spout 22 of the said vessel. My frame being constructed of spring material will readily shape itself to spouts on any ordinary utensils. The device is not only designed for employment on tea and coffee pots but may be successfully employed in connection with cans, pails, stew pans, etc.

Having thus described the invention, what is claimed as new is:—

1. A screening attachment for the spouts of coffee or tea pots, comprising a body member frictionally contacting with the inner surface of a spout and a hinged spring influenced screening member supported by the body and frictionally contacting therewith.

2. In combination with a vessel having a spout and having apertures communicating with the spout, of a hinged strainer in the spout, spring means for normally sustaining the strainer in one position, and hook members carried by the strainer and engaging with certain of the apertures of the vessel for holding the strainer to the vessel.

3. In combination with a coffee or tea pot having a pouring spout and apertures communicating with the spout, of a strainer therefor, including a resilient body member designed to be inserted in the spout and to frictionally engage therewith, a shaft journaled on said body, offset hooks on the shaft engaging with certain of the apertures in the vessel, a spring surrounding said shaft, and a strainer hingedly secured to the shaft and influenced by the spring for retaining the same in frictional contact with the body member.

In testimony whereof I affix my signature.

FLORA DUVALL.